US012400461B2

(12) United States Patent
Baumann et al.

(10) Patent No.: US 12,400,461 B2
(45) Date of Patent: Aug. 26, 2025

(54) AUTOMATED IDENTIFICATION OF NECROTIC REGIONS IN DIGITAL IMAGES OF MULTIPLEX IMMUNOFLUORESCENCE STAINED TISSUE

(71) Applicant: Ventana Medical Systems, Inc., Tucson, AZ (US)

(72) Inventors: Jessica Baumann, Tuscon, AZ (US); Mehrnoush Khojasteh, Redwood City, CA (US); Fahime Sheikhzadeh, Santa Clara, CA (US); Anirudh Som, Tempe, AZ (US); Aicha Beya Ben Taieb, Mountain View, CA (US)

(73) Assignee: Ventana Medical Systems, Inc., Tuscon, AZ (US)

( * ) Notice: Subject to any disclaimer, the term of this patent is extended or adjusted under 35 U.S.C. 154(b) by 0 days.

(21) Appl. No.: 18/159,619

(22) PCT Filed: Aug. 11, 2021

(86) PCT No.: PCT/US2021/045507
§ 371 (c)(1),
(2) Date: Jan. 25, 2023

(87) PCT Pub. No.: WO2022/035943
PCT Pub. Date: Feb. 17, 2022

(65) Prior Publication Data
US 2024/0412541 A1    Dec. 12, 2024

Related U.S. Application Data

(60) Provisional application No. 63/065,350, filed on Aug. 13, 2020.

(51) Int. Cl.
G06K 9/00       (2022.01)
A61K 35/12      (2015.01)
(Continued)

(52) U.S. Cl.
CPC ............... *G06V 20/69* (2022.01); *G06T 5/92* (2024.01); *G06T 7/0012* (2013.01); *G06T 2207/30024* (2013.01)

(58) Field of Classification Search
CPC ........... G06K 9/00; A61K 35/12; G06V 20/69
(Continued)

(56) References Cited

U.S. PATENT DOCUMENTS 11,908,130 B2 *   2/2024  Natan ..................... G06T 7/11
2012/0010528 A1 * 1/2012  Donovan ................ G06T 7/194
                                                  382/128
(Continued)

FOREIGN PATENT DOCUMENTS

JP    2015514212 A    5/2015
WO    2020025684 A1   2/2020

OTHER PUBLICATIONS

Multiplex Immunofluorescence Assays Alejandro Francisco-Cruz, Edwin Roger Parra, Michael T. Tetzlaff, and Ignacio I. Wistuba (Year: 2020).*

(Continued)

*Primary Examiner* — Seyed H Azarian
(74) *Attorney, Agent, or Firm* — Kilpatrick Townsend & Stockton LLP

(57) ABSTRACT

Embodiments disclosed herein generally relate to identifying necrotic tissue in a multiplex immunofluorescence image of a slice of specimen. Particularly, aspects of the present disclosure are directed to accessing a multiplex immunofluorescence image of a slice of specimen comprising a first channel for a nuclei marker and a second channel for an epithelial tumor marker, wherein the slice of specimen comprises one or more necrotic tissue regions; providing the multiplex immunofluorescence image to a machine-learning model; receiving an output of the machine-learning model (Continued)

corresponding to a prediction that the multiplex immunofluorescence image includes one or more necrotic tissue regions at one or more particular portions of the multiplex immunofluorescence image; generating a mask for subsequent image processing of the multiplex immunofluorescence image based on the output of the machine-learning model; and outputting the mask for the subsequent image processing.

15 Claims, 10 Drawing Sheets
(5 of 10 Drawing Sheet(s) Filed in Color)

(51) Int. Cl.
 *G06T 5/92* (2024.01)
 *G06T 7/00* (2017.01)
 *G06V 20/69* (2022.01)
(58) Field of Classification Search
 USPC ........ 382/100, 103, 106–107, 128–133, 154, 382/156, 167, 172, 173, 181, 199, 214, 382/224, 254, 276, 286–291, 305, 312; 378/4, 21, 6, 29
 See application file for complete search history.

(56) References Cited

U.S. PATENT DOCUMENTS

| | | | | |
|---|---|---|---|---|
| 2019/0392580 | A1* | 12/2019 | Kapil | G06V 20/695 |
| 2020/0150123 | A1* | 5/2020 | Shipitsin | G06T 7/136 |
| 2024/0273719 | A1* | 8/2024 | Nie | G06T 7/0012 |
| 2024/0412541 | A1* | 12/2024 | Baumann | G06T 7/0012 |

OTHER PUBLICATIONS

Biomark (Year: 2020).*
JP Application No. 2023-509712, "Office Action", mailed on Jan. 10, 2024, 13 pages.
Kohl et al., "A Probabilistic U-Net for Segmentation of Ambiguous Images", Advances in Neural Information Processing Systems (NIPS 2018) arXiv:1806.05034v4 [vs.CV], Jan. 29, 2019, 28 pages.
JP Application No. 2023509712 , "Notice of Allowance", Apr. 26, 2024, 6 pages.
PCT/US2021/045507 , "International Search Report and Written Opinion", Nov. 18, 2021, 14 pages.
Saltz et al., "Spatial Organization and Molecular Correlation of Tumor-Infiltrating Lymphocytes Using Deep Learning on Pathology Images", Cell Reports, vol. 23, No. 1, Apr. 3, 2018, 35 pages.
Wortman et al., "Occupancy and Fractal Dimension Analyses of the Spatial Distribution of Cytotoxic (CD8+) T Cells Infiltrating the Tumor Microenvironment in Triple Negative Breast Cancer", Biophysical Reviews and Letters, vol. 15, No. 2, Jun. 25, 2020, 16 pages.

* cited by examiner

AUTOMATED IDENTIFICATION OF NECROTIC REGIONS IN DIGITAL IMAGES OF MULTIPLEX IMMUNOFLUORESCENCE STAINED TISSUE

CROSS-REFERENCE TO RELATED APPLICATION

The present application is a continuation of International Application No. PCT/US2021/045507, entitled "Automated Identification of Necrotic Regions in Digital Images of Multiplex Immunofluorescence Stained Tissue" and filed Aug. 11, 2021, which claims priority to U.S. Provisional Application No. 63/065,350, filed on Aug. 13, 2020. Each of these applications is hereby incorporated by reference in its entirety for all purposes.

FIELD

The present disclosure relates to digital pathology, and in particular to techniques for using a machine-learning model to identify depictions of necrotic tissue regions in digital images of multiplex immunofluorescence stained tissue.

BACKGROUND

Digital pathology involves scanning slides of samples (e.g., tissue samples, blood samples, urine samples, etc.) into digital images. The sample can be stained such that select proteins (antigens) in cells are differentially visually marked relative to the rest of the sample. The target protein in the specimen may be referred to as a biomarker. Digital images depicting a sample with multiple stains for different biomarkers can be generated for a tissue sample. A digital image that depicts a sample stained with multiple stains may be referred to may be referred to as multiplex immunofluorescence images. Multiplex immunofluorescence images can allow visualization of the spatial relationship between tumorous and non-tumorous cells in a tissue sample.

Image analysis may be performed to identify and quantify the biomarkers in the tissue sample. The image analysis can be performed by computing systems or pathologists to facilitate characterization of the biomarkers (e.g., in terms of presence, size, shape and/or location) so as to inform (for example) diagnosis of a disease, determination of a treatment plan, or assessment of a response to a therapy.

Digital pathology algorithms can quantify the expression and co-expression of biomarkers and characterize their spatial relationships in the tumor microenvironment (TME) on a cell-by-cell basis. These algorithms usually rely on manual identification of the tumor area in whole slide images (WSIs) by a pathologist. Necrotic regions are also manually annotated to be excluded from phenotype detection and reporting. A necrotic region is a spectrum of morphological changes that follow cell death in living tissue. The variation in the size, shape, and number of necrotic regions across WSIs makes their manual annotation an error-prone and time-consuming task.

SUMMARY

In some embodiments, a method is provided. A multiplex immunofluorescence image of a slice of specimen is accessed. The multiplex immunofluorescence image can include a first channel for a nuclei marker and a second channel for an epithelial tumor marker. The slice of specimen can include one or more necrotic tissue regions. The multiplex immunofluorescence image is processed using a machine-learning model (e.g., U-Net model). An output of the processing can correspond to a prediction as to whether the multiplex immunofluorescence image includes one or more necrotic tissue regions. The prediction may identify one or more particular portions of the multiplex immunofluorescence image predicted to depict necrotic tissue. A mask is generated based on the output of the machine-learning model. The mask is output and used for subsequent image processing of the multiplex immunofluorescence image.

In some embodiments, the nuclei marker comprises 4',6-diamidino-2-phenylindole (DAPI) and the epithelial tumor marker comprises pan-cytokeratin (PanCK).

In some embodiments, the method includes preprocessing the multiplex immunofluorescence image using gamma correction and normalization prior to providing the multiplex immunofluorescence image to the machine-learning model In some instances, performing the subsequent image processing includes generating a modified version of the multiplex immunofluorescence image by applying the mask to the multiplex immunofluorescence image and processing the modified version of the multiplex immunofluorescence image. A result of the processing is output. The result corresponds to detected depictions of a set of tumor cells in the slice of specimen and characterizes a presence of, quantity of, and/or size of the set of tumor cells.

In some embodiments, the computer-implemented method can include generating a plurality of tile images from the multiplex immunofluorescence image. The plurality of tile images can be provided to the machine-learning model as the multiplex immunofluorescence image.

In some embodiments, the subsequent image processing can further include accessing a second image of the slice of specimen and applying the mask to the second image. A presence of, quantity of, and/or size of a set of tumor cells in the slice of specimen can be determined by processing the second image with the mask. The presence of, quantity of, and/or size of the set of tumor cells in the slice of specimen can be output.

Some embodiments of the present disclosure include a system including one or more data processors. The system can further include a non-transitory computer readable storage medium containing instructions which, when executed on the one or more data processors, cause the one or more data processors to perform part or all of one or more of the methods disclosed herein.

In some embodiments, a computer-program product is provided that is tangibly embodied in a non-transitory machine-readable storage medium. The computer-program product can include instructions configured to cause one or more data processors to perform part or all of one or more of the methods disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Aspects and features of the various embodiments will be more apparent by describing examples with reference to the accompanying drawings, in which.

Figure 1:
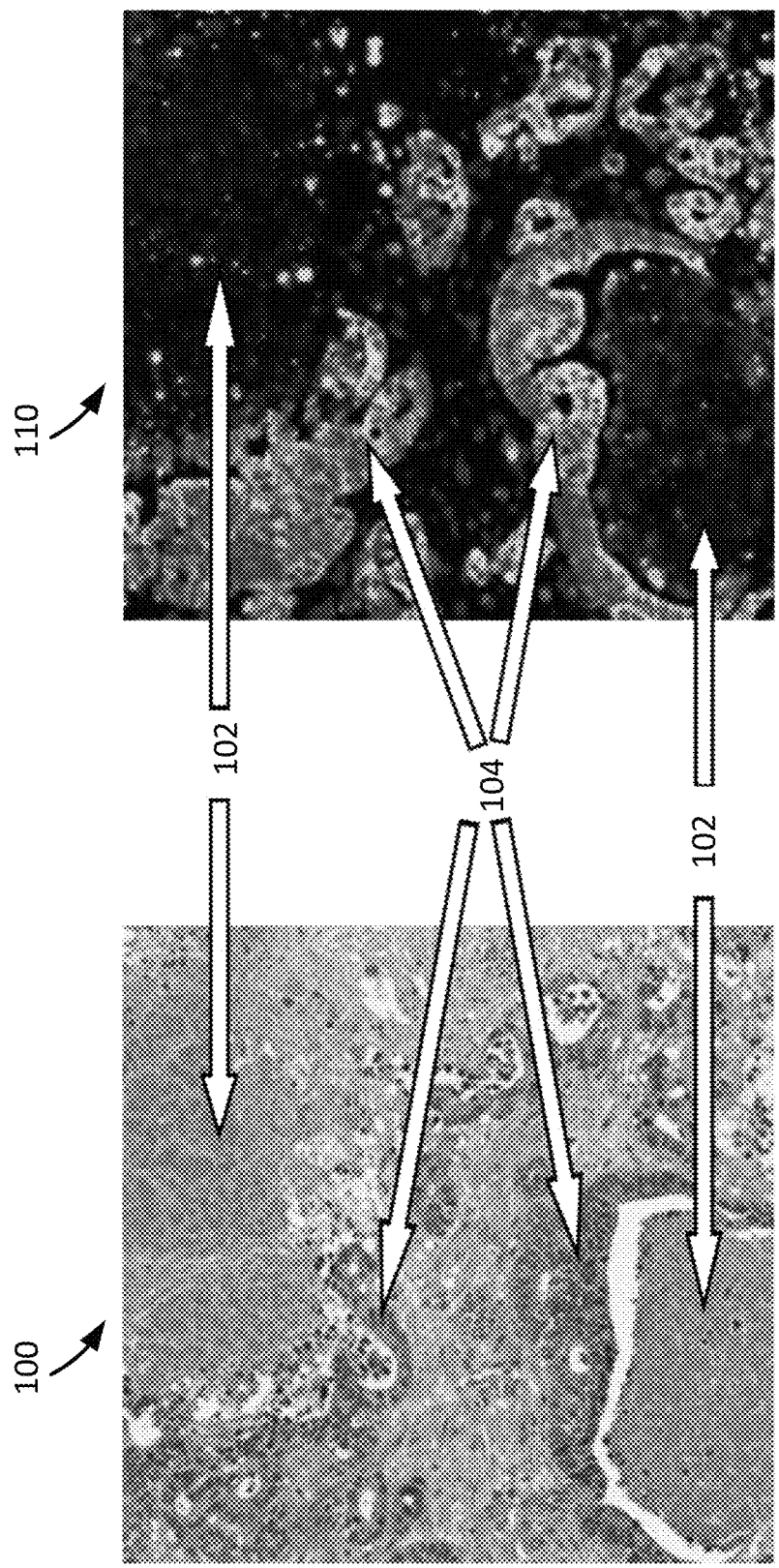
FIG. 1 illustrates exemplary depictions of necrotic tissue regions in multiplex immunofluorescence images according to some aspects of the present disclosure.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

I. Overview

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

The present disclosure describes techniques for automatically identifying depictions of necrotic tissue in digital pathology images. More specifically, some embodiments of the present disclosure provide machine-learning techniques for identifying depictions of necrotic tissue in multiplex immunofluorescence images to support or improve disease detection and analysis.

Multiplex immunofluorescence slide staining can enable multiple proteins in a tissue section to be simultaneously detected. Multiplex immunofluorescence images may be used in the study of different types of cells in biological tissue, blood, or urine. With respect to tissue, a biopsy of the biological tissue may be collected, fixed (e.g., using a formaldehyde solution) and embedded, after which the sample may be sliced into smaller sections. Each slice can be applied to a glass slide for staining and analysis. During staining, primary antibodies and one or more types of secondary antibodies can be applied to the specimen to amplify immunofluorescence signals. The stains may include biomarkers for different biological material, such as biomarkers for nuclei and biomarkers for epithelial tumor cells. After each antibody in a primary and secondary antibody pair is applied, the slide can be scanned to generate an image of the slide. The slide may be washed between application of the primary and secondary antibody. The images can be combined after the staining process to generate the multiplex immunofluorescence image. Alternatively, both antibodies may be applied and a single image may be taken.

During imaging and analysis, regions of the multiplex immunofluorescence image may be segmented into target regions (e.g., tumor cells) and non-target regions (e.g., normal tissue or blank slide regions). Each target region can include a region of interest that may be characterized and/or quantified. In some instances, the multiplex immunofluorescence image may include biological material or other structures that do not correspond to regions of interest that fluoresce, such that it becomes difficult to differentiate target and non-target regions. For example, necrotic tissue can result in false detection of nuclei in the DAPI channel by the necrotic tissue fluorescing, misclassification of individual markers, and incorrect segmentation of tumor areas.

FIG. 1 illustrates exemplary depictions of necrotic tissue regions in multiplex immunofluorescence images. An image 100 shows a tissue stained with a hematoxylin and eosin (H&E) stain, and a multiplex immunofluorescence image 110 shows a fluorescent multiplex of the tissue. The tissue includes tumor cells 104 and necrotic regions 102. A pathologist may annotate areas of interest (e.g., tumor cells 104) in multiplex immunofluorescence image 110, while the pathologist may attempt to avoid annotating necrotic tissue regions 102. The pathologist may additionally annotate the necrotic regions 102 so that further analysis of the multiplex immunofluorescence image exclude the necrotic regions 102 from analysis. These annotations may be subject to error and can be time intensive when a large number of slides is to be processed.

Automated identification and segmentation of necrotic tissue from multiplex immunofluorescence images may provide more accurate and faster differentiation of necrotic tissue regions and regions of interest, which can result in more efficient and better diagnosis and treatment assessment of diseases (e.g., cancer and/or an infectious disease). Stains used for multiplex immunofluorescence images may stain their target biomarkers as well as necrotic tissue, making detection and segmentation difficult or inaccurate. As a result, conventional image analysis algorithms usually provide over-detection, under-detection, or inaccurate detection of necrotic regions in multiplex immunofluorescence images.

In some embodiments, a machine-learning model is provided to predict locations of necrotic tissue in a multiplex immunofluorescence image. In some instances, the machine-learning model has a convolutional neural network (CNN) architecture that utilizes a U-Net model to automatically identify depictions of necrotic tissue in multiplex immunofluorescence images. The machine-learning model can be trained using training images that include a set of positive data elements (images depicting necrotic tissue) and a set of negative data elements (images not depicting necrotic tissue). Each positive data element may include one or more indications as to where, within the image, each necrotic tissue region is depicted. Training the machine-learning model can include, for example, learning necrotic tissue characteristics or signatures (e.g., intensity and texture features). Training may also or alternatively include learning how to modify the image (e.g., remove or otherwise modify the depicted necrotic tissue) based on characteristics of necrotic tissue. The trained machine-learning model can be used to predict particular portions of a multiplex immunofluorescence image that depict necrotic tissue. In some examples, the machine-learning model may be trained for multi-channel data such that the trained machine-learning model processes a multiplex immunofluorescence image of a sample stained with multiple stains. The stains can include a nuclei marker, such as 4',6-diamidino-2-phenylindole (DAPI), and an epithelial tumor marker, such as pan-cytokeratin (PanCK). The machine-learning model may be trained for additional or alternative stains. In some instances, the machine-learning model is executed as part of pre-processing before performing an image analysis algorithm to detect and/or characterize depictions of other types of cells (e.g., tumor cells, immune cells, or leukocytes). However, as should be understood by one of ordinary skill in the art, the concepts discussed herein are not limited to pre-processing procedures, but may also be integrated into the overall image analysis processing in accordance with various embodiments.

An output can be generated that indicates the predicted particular portions of the multiplex immunofluorescence image depicting necrotic tissue. In some examples, the machine-learning model may adjust the multiplex immunofluorescence image based on the prediction and learned adjustment parameters. For example, a mask may be generated based on the predicted particular portions, and the mask may be applied to the multiplex immunofluorescence image in subsequent image processing. The subsequent image processing can include processing one or more multiplex immunofluorescence images and/or modified versions thereof (e.g., processing a modified version of the multiplex immunofluorescence image, processing one or more other multiplex immunofluorescence images and/or processing modified versions of one or more other multiplex immunofluorescence images) and outputting a result. The result can characterize a presence of, location of, quantity of, and/or size of a set of tumor cells in the multiplex immunofluorescence image. The result may be used to determine a diagnosis, a treatment plan, or to assess an ongoing treatment for the tumor cells.

II. Definitions and Abbreviations

As used herein, when an action is "based on" something, this means the action is based at least in part on at least a part of the something.

As used herein, the terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, and 10 percent.

As used herein, the term "sample" "biological sample" or "tissue sample" refers to any sample including a biomolecule (such as a protein, a peptide, a nucleic acid, a lipid, a carbohydrate, or a combination thereof) that is obtained from any organism including viruses. Other examples of organisms include mammals (such as humans: veterinary animals like cats, dogs, horses, cattle, and swine; and laboratory animals like mice, rats and primates), insects, annelids, arachnids, marsupials, reptiles, amphibians, bacteria, and fungi. Biological samples include tissue samples (such as tissue sections and needle biopsies of tissue), cell samples (such as cytological smears such as Pap smears or blood smears or samples of cells obtained by microdissection), or cell fractions, fragments or organelles (such as obtained by lysing cells and separating their components by centrifugation or otherwise). Other examples of biological samples include blood, serum, urine, semen, fecal matter, cerebrospinal fluid, interstitial fluid, mucous, tears, sweat, pus, biopsied tissue (for example, obtained by a surgical biopsy or a needle biopsy), nipple aspirates, cerumen, milk, vaginal fluid, saliva, swabs (such as buccal swabs), or any material containing biomolecules that is derived from a first biological sample. In certain embodiments, the term "biological sample" as used herein refers to a sample (such as a homogenized or liquefied sample) prepared from a tumor or a portion thereof obtained from a subject.

As used herein, the term "biological material or structure" refers to natural materials or structures that comprise a whole or a part of a living structure (e.g., a cell nucleus, a cell membrane, cytoplasm, a chromosome, DNA, a cell, a cluster of cells, or the like).

As used herein, the term "non-target region" refers to a region of an image having image data that is not intended to be assessed in an image analysis process. Non-target regions may include non-tissue regions of an image corresponding to a substrate such as glass with no sample, for example where there exists only white light from the imaging source. Non-target regions may additionally or alternatively include tissue regions of an image corresponding to biological material or structures that are not intended to be analyzed in the image analysis process or difficult to differentiate from biological material or structures within target regions (e.g., stromal cells, normal cells, scanning artifacts).

As used herein, the term "target region" refers to a region of an image including image data that is intended be assessed in an image analysis process. Target regions include any region such as tissue regions of an image that is intended to be analyzed in the image analysis process (e.g., tumor cells)

As used herein, the term "tile" or "tile image" refers to a single image corresponding to a portion of a whole image, or a whole slide. In some embodiments, "tile" or "tile image" refers to a region of a whole slide scan or an area of interest having (x, y) pixel dimensions (e.g., 1000 pixels by 1000 pixels). For example, consider a whole image split into M columns of tiles and N rows of tiles, where each tile within the Mx N mosaic comprises a portion of the whole image, i.e. a tile at location MI, NI comprises a first portion of an image, while a tile at location M3,N4 comprises a second portion of the image, the first and second portions being different. In some embodiments, the tiles may each have the same dimensions (pixel size by pixel size).

As used herein, the term "multiplex immunofluorescence image" refers to a whole slide image or a patch of a whole slide image of a biological specimen (e.g., a tissue slice, blood smear or urine smear) that has been stained for multiple biomarkers. Each of the biomarkers can fluoresce at a different wavelength when excited, such that each biomarker can be uniquely identified.

As used herein, the term "slice of specimen" refers to any biological sample (such as tissue sections, needle biopsies of tissue, blood, and urine) from an organism. Examples of organisms include humans, veterinary animals, and laboratory animals. In certain embodiments, the term "slice of specimen" as used herein refers to a sample prepared from a tumor or a portion thereof obtained from a subject.

III. Computing Environment

Figure 2:
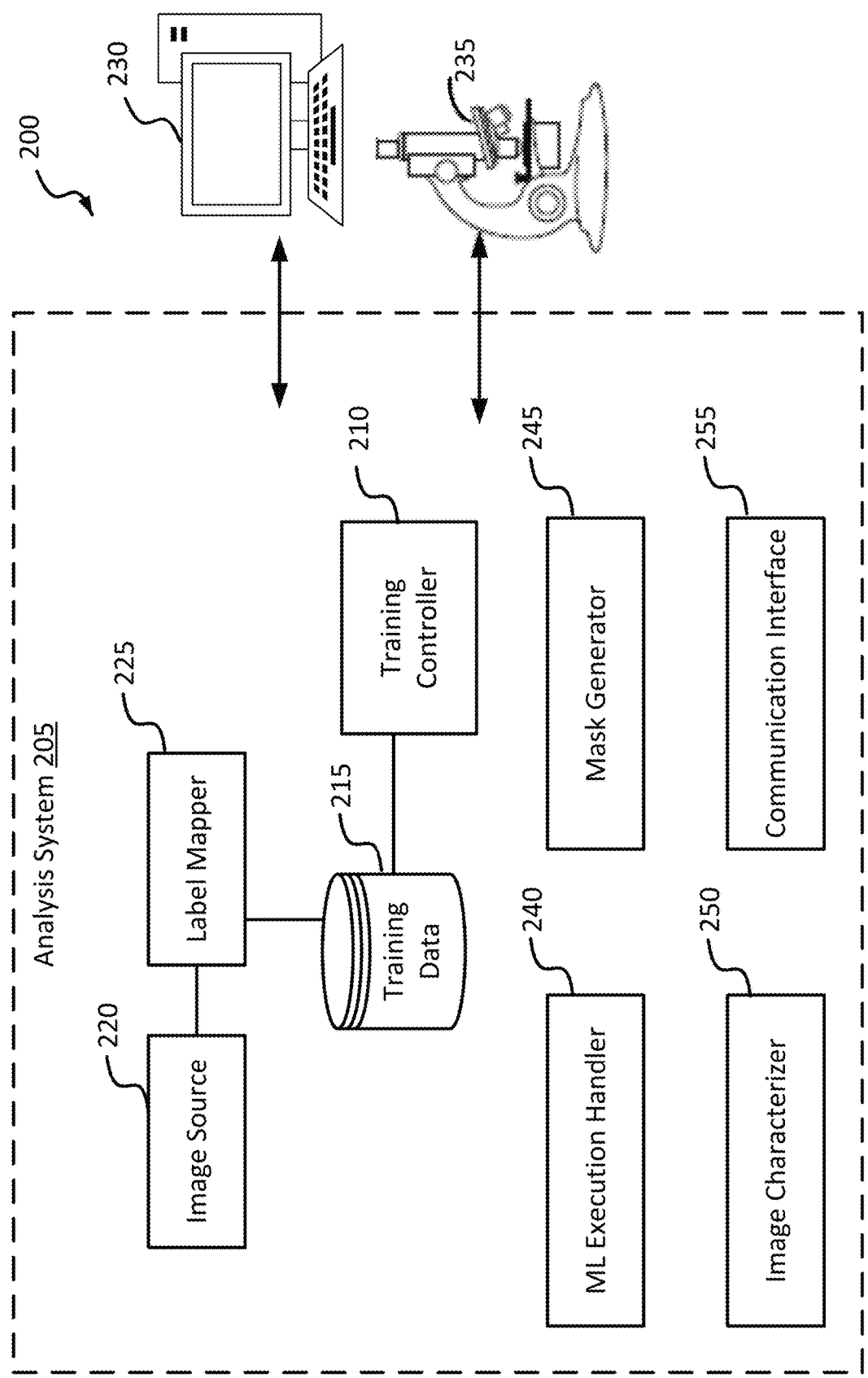
FIG. 2 illustrates an exemplary computing system for training and using a machine-learning model to facilitate identifying depictions of necrotic tissue according to some aspects of the present disclosure.

FIG. 2 shows an exemplary computing system 200 for training and using a necrotic tissue detection machine-learning model to facilitate identification of depictions of necrosis and for processing digital-pathology images. The computing system 200 can include an analysis system 205 to train and execute the necrotic tissue detection machine-learning model. Examples of the necrotic tissue detection machine-learning model include a convolutional neural network, a deep neural network, a U-Net, a V-Net, a residual neural network, and/or a recurrent neural network. The necrotic tissue detection machine-learning model may be trained and/or used to (for example) predict whether a multiplex immunofluorescence image includes a depiction of one or more necrotic tissue regions. The analysis system 205 may further train and/or use one or more other machine-learning models to perform another type of detection (e.g., depicting tumor cells). The other machine-learning model(s) may include (for example) a convolutional neural network, a U-Net, V-Net, and/or deep neural network. In some instances, an image is processed using results from the necrotic tissue detection machine-learning model (e.g., to remove or obscure each necrotic tissue region), and the other machine-learning model(s) can receive and use the processed image to perform the other type of detection. In some instances, results from the necrotic tissue detection machine-learning model are used to identify patches and/or images that are to be excluded when performing the other type of detection.

In some embodiments, the multiplex immunofluorescence image generated is stored in a memory device. The multiplex immunofluorescence image may be generated using the imaging device 235. In some embodiments, the image is generated or obtained from a microscope or other instrument capable of capturing image data of a specimen-bearing microscope slide, as described herein. In some embodiments, the multiplex immunofluorescence image is generated or obtained using a 2D scanner, such as one capable of scanning image tiles. Alternatively, the multiplex immunofluorescence image may have been previously generated (e.g. scanned) and stored in a memory device (or, for that matter, retrieved from a server via a communication network).

In some instances, a training controller 210 determines or learns preprocessing parameters and/or techniques for the multiplex immunofluorescence image. For example, preprocessing can include dividing the multiplex immunofluorescence image into tiles and performing modifications on the tiles. Each of the tiles can be divided into one or more patches. The patches may be a relatively small size (e.g., 512×512). A patch can be selected based on features (e.g., edges) being identified in the patch. The selected patch can correspond to the multiplex immunofluorescence image and be processed with the trained necrotic tissue detection machine-learning model. The analysis system 205 may select one or more patches of the whole slide image to process using the necrotic tissue detection machine-learning model. The preprocessing modifications can include performing gamma correction on multiplex immunofluorescence images or tiles. The gamma correction can bring the bit range information of the multiplex immunofluorescence image from 16-bit to 8-bit, which can result in pixel intensities ranging from 0 to 255. Other exemplary preprocessing can include normalizing the gamma corrected multiplex immunofluorescence images by dividing each pixel by 255 to bring the overall intensity range between 0 and 1.

The training controller 210 can execute code to train the necrotic tissue detection machine-learning model and/or the other machine-learning model(s) using one or more training data sets 215. Each training data set 215 can include a set of training multiplex immunofluorescence images. Each of the multiplex immunofluorescence images may include a digital pathology image that depicts one or more biological objects (e.g., a set of cells of one or more types). The training data may depict samples stained with (for example) a nuclei marker (e.g., DAPI, propidium iodide, TO-PROR-3, Hoechst, or SYTOXR stains) and an epithelial tumor marker (e.g., PanCK, Epithelial cell adhesion molecule (EpCAM), or tissue polypeptide antigen (TPA)). Each image in a first subset of the set of training multiplex immunofluorescence images may include a depiction of one or more necrotic tissue regions, and each image in a second subset of the set of training multiplex immunofluorescence images may lack depictions of necrotic tissue regions (e.g., may not depict any necrotic tissue regions). Each of the multiplex immunofluorescence images may depict a portion of a sample, such as a tissue sample (e.g., colorectal, bladder, breast, pancreas, lung, or gastric tissue). In some instances, each of one or more of the multiplex immunofluorescence images depicts a plurality of tumor cells. The training data 215 may have been collected (for example) from an image source 220, such as a public data store, and/or from data received from (for example) one or more laboratories.

The computing system 200 can include a label mapper 225 that maps multiplex immunofluorescence images from the image source 220 depicting necrotic tissue regions to an "necrotic tissue" label and that maps multiplex immunofluorescence images not depicting necrotic tissue to a "non-necrotic" label. The label may be an image-level label that indicates whether necrosis is depicted or not in a multiplex immunofluorescence image. The label may alternatively be data that indicates where necrosis is depicted in a multiplex immunofluorescence image. Mapping data may be stored in a mapping data store (not shown). The mapping data may identify each multiplex immunofluorescence image that is mapped to either of the necrotic tissue label or non-necrotic label.

In some instances, labels associated with the training multiplex immunofluorescence images may have been received or may be derived from data received from one or more provider systems 230, each of which may be associated with (for example) a pathologist, image scientist, physician, nurse, hospital, pharmacist, laboratory, etc. associated with a particular subject. The received data may include (for example) one or more medical records corresponding to the particular subject. The medical records may indicate (for example) a professional's diagnosis or characterization that indicates, with respect to a time period corresponding to a time at which one or more input image elements associated with the subject were collected or a subsequent defined time period, whether the subject had a tumor and/or a stage of progression of the subject's tumor (e.g., along a standard scale and/or by identifying a metric, such total metabolic tumor volume (TMTV)). The received data may further identify locations of tumors or tumor cells within the one or more multiplex immunofluorescence images (e.g., by identifying a point pixel for each tumor or tumor cell or a boundary for each tumor or tumor cell) associated with the subject. In some instances, images or scans that are input to one or more classifier subsystems are received from the provider system 230. For example, the provider system 230 may receive images from an imaging device 235 and may then transmit the images or scans (e.g., along with a subject identifier and one or more labels) to the analysis system 205.

Training controller 210 can use the mappings of the training data 215 to train a necrotic tissue detection machine-learning model. More specifically, training controller 210 can access an architecture of a model (e.g., U-Net model), define (fixed) hyperparameters for the model (which are parameters that influence the learning process, such as e.g. the learning rate, size/complexity of the model, etc.), and train the model such that a set of parameters are learned. More specifically, the set of parameters may be learned by identifying parameter values that are associated with a low or lowest loss, cost or error generated by comparing predicted outputs (obtained using given parameter values) with actual outputs. A sum of binary cross-entropy loss and dice coefficient may be used by the training controller 210 to train and assess mask prediction performance of the necrotic tissue detection machine-learning model.

In some instances, a necrotic tissue detection machine-learning model can be configured to retrain or fine-tune the necrotic tissue detection machine-learning model to improve estimation accuracy of an output (e.g., that includes a metric or identifier corresponding to an estimate or likelihood as to portions of the multiplex immunofluorescence image that depict necrotic tissue). The necrotic tissue detection machine-learning model may additionally be trained to adjust the multiplex immunofluorescence image by removing or obscuring portions predicted to depict necrotic tissue. The training data 215 can include input multiplex immunofluorescence images and adjusted images based on the output. For example, the necrotic tissue detection machine-learning model can learn to filter or remove necrotic tissue regions in the multiplex immunofluorescence image. Pixels determined to depict part of a necrotic tissue region may be set to an intensity of 0 or a mean or median intensity value determined using intensities of other pixels.

A machine learning (ML) execution handler 240 can use the architecture and learned parameters to process non-training data and generate a result. For example, ML execution handler 240 may access a multiplex immunofluorescence image of a slice of specimen not represented in the training data 215. The multiplex immunofluorescence image may depict a sample stained with a same stain or a different stain as the training data. For example, the multiplex immunofluorescence image may depict a nuclei marker (e.g., DAPI, propidium iodide, TO-PRO®-3, Hoechst, or SYTOX® stains) and an epithelial tumor marker (e.g., PanCK, EpCAM, or TPA). As an example, the multiplex immunofluorescence image may include a 5plex assay for cluster of differentiation 3 (CD3), cluster of differentiation 8 (CD8), cluster of differentiation 68 (CD68), Programmed death-ligand 1 (PD-L1), and PanCK represented by Cyanine-5 (Cy5), Rhodamine 6G, Rhodamine-610, carboxy fluorescein (FAM), and N,N'-Dicyclohexylcarbodiimide (DCC) fluorophores and DAPI as a counterstain. The multiplex immunofluorescence image may (but need not) be preprocessed in accordance with a learned or identified preprocessing technique. The (preprocessed or original) multiplex immunofluorescence image may be fed into a necrotic tissue detection machine-learning model having an architecture (e.g., U-Net) used during training and configured with learned parameters. The necrotic tissue detection machine-learning model can output a prediction that one or more particular portions of the multiplex immunofluorescence image includes a depiction of necrotic tissue cells. A depiction of necrotic tissue can include a depiction of a region within which at least 30%, at least 50%, at least 75%, or at least 90% of the cells appear to be undergoing necrosis. The output may include, for each pixel, a probability that the pixel is part of a depiction of necrotic tissue cells. Additionally or alternatively, the output may be coordinates of rectangular regions predicted to depict necrosis. The ML execution handler 240, or another component of the analysis system 205, may perform postprocessing on the output. For example, if a probability is output for each pixel indicating the probability of the pixel being part of a depiction of necrotic tissue cells, filtering may be applied to smooth the values. The ML execution handler 240 can output the prediction for subsequent analysis.

A mask generator 245 can use the prediction to generate a mask for the multiplex immunofluorescence image. In instances where an output from the necrotic tissue detection machine-learning model includes a probability that each pixel is part of a depiction of necrotic tissue cells, generation of the mask can include comparing each probability to a predefined threshold (e.g., 50%) to transform each probability to a binary value. The mask can be a binary image, with each value of 1 representing a prediction that a corresponding pixel is part of a depiction of a necrotic cell and each value of 0 representing a prediction that a corresponding pixel is not part of a depiction of a necrotic cell (or that a corresponding pixel does not depict part of a tissue slice). The mask may be used in subsequent image processing to remove or otherwise segment the predicted necrotic tissue regions in the multiplex immunofluorescence image.

In some instances, subsequent image processing is performed by an image processor (not shown). The subsequent image processing can be based on the prediction that the multiplex immunofluorescence image depicts necrotic tissue. For example, the subsequent image processing can include determining that at least one metric corresponding to the particular portions (e.g., one or more pixels) of the multiplex immunofluorescence image exceeds a predefined threshold. The determination may be performed for each of one or more regions of the multiplex immunofluorescence image, where each of the one or more regions was predicted to depict necrotic tissue. Examples of the metric can include a cumulative size of the necrotic tissue (e.g., a number of pixels depicting at least part of a necrotic tissue region), a number of necrotic tissue regions, and/or probability that the multiplex immunofluorescence image includes at least one necrotic tissue region. For example, a predefined threshold for the probability that a particular portion depicts necrotic tissue may be 70%. Based on determining a particular portion of the multiplex immunofluorescence image has a probability of depicting necrotic tissue above 70%, the subsequent image processing can be performed.

In some instances, the image processor may generate a modified version of the multiplex immunofluorescence image based on the prediction. Generating the modified version may include applying the mask to the multiplex immunofluorescence image or applying other image-enhancing techniques to each of the predicted particular portions of the multiplex immunofluorescence image depicting necrotic tissue cells. Application of the mask can include multiplying, for each pixel in the image, a value of the mask by a value of the multiplex immunofluorescence image. The modified version of the multiplex immunofluorescence image can then be processed with another machine-learning model.

In some instances, the subsequent image processing includes modifying one or more other images based on locations of the particular portions predicted to depict necrotic tissue in the multiplex immunofluorescence image. The other images can correspond to the same or a different slice of the specimen. Modifying the other images may include applying the mask, filtering, or segmenting the other images at locations in the other slice of the specimen that correspond to the locations of the particular portions in the multiplex immunofluorescence image based on the mask. The other images can then be processed with one or more machine-learning models to determine a predicted characterization of the specimen.

In some instances, an image characterizer 250 identifies a predicted characterization for the multiplex immunofluorescence image based on the execution of the subsequent image processing. The execution may itself produce a result that includes the characterization, or the execution may include results that image characterizer 250 can use to determine a predicted characterization of the specimen. For example, the subsequent image processing may include detecting depictions of a set of tumor cells. A result may characterize a presence, quantity of, and/or size of the set of tumor cells. Image characterizer 250 may apply rules and/or transformations to map the probability and/or confidence to a characterization. As an illustration, a first characterization may be assigned if a result includes a probability greater than 50% that the multiplex immunofluorescence image includes a set of tumor cells, and a second characterization may be otherwise assigned.

A communication interface 255 can collect results and communicate the result(s) (or a processed version thereof) to a user device (e.g., associated with a laboratory technician or care provider) or other system. For example, communication interface 255 may generate an output that identifies the presence of, quantity of and/or size of the set of tumor cells. The output may then be presented and/or transmitted, which may facilitate a display of the output data, for example on a display of a computing device.

IV. Exemplary Process

Figure 3:
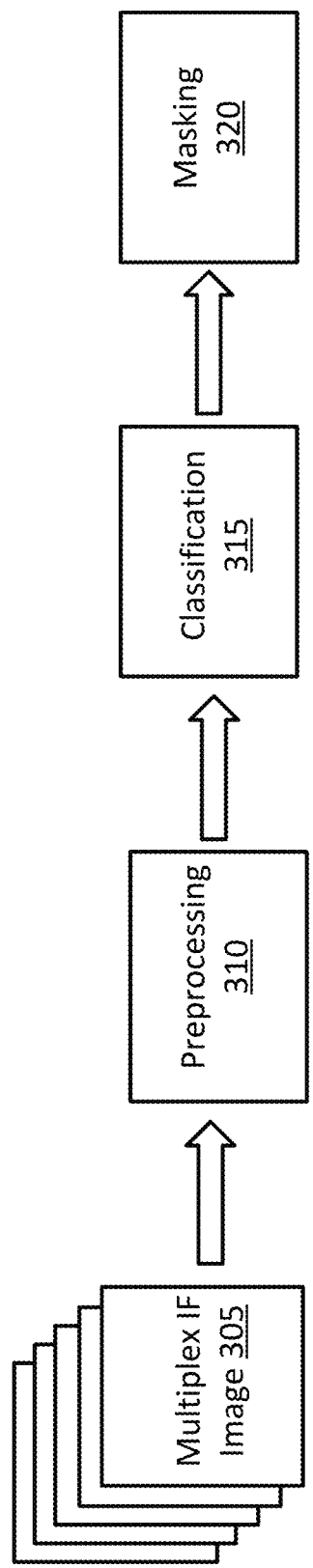
FIG. 3 illustrates a block diagram of a process for necrotic tissue region prediction according to some aspects of the present disclosure.

FIG. 3 illustrates a block diagram of a process for necrotic tissue region prediction according to some aspects of the present disclosure. A multiplex immunofluorescence image 305 may be received from a provider system or imaging device, such as the provider system 230 or the imaging device 235 in FIG. 2. The multiplex immunofluorescence image 305 can depict a slice of specimen including at least two channels. The channels can include at least a nuclei marker and an epithelial tumor marker.

In some instances, the multiplex immunofluorescence image is preprocessed 310. The preprocessing 310 may involve (for example) performing gamma correction on the multiplex immunofluorescence image 305 to bring an intensity range of pixels in the multiplex immunofluorescence image 305 into a predefined range (e.g., between 0 and 255). The preprocessing 310 may additionally involve normalizing the values of the intensity by dividing each gamma corrected pixel intensity by the upper limit of the predefined range (e.g., 255), so that the resulting pixel intensity range is between 0 and 1. The preprocessing 310 may also include normalizing and/or standardizing values (without using a gamma correction), cropping the multiplex immunofluorescence image, or filtering the image (e.g., to depict intensities across a subset of wavelengths or colors).

Classification 315 can then be performed on the preprocessed multiplex immunofluorescence image. Classification 315 may involve inputting the preprocessed immunofluorescence image into a trained necrotic tissue detection machine-learning model (e.g., a U-Net) that can generate a prediction of particular portions of the slice of specimen that depict necrotic tissue. The prediction can be a probability of each pixel depicting necrotic tissue. Alternatively, the prediction may be a binary classification performed for each pixel. The classification 315 can be performed by an ML execution handler, such as the ML execution handler 240 in FIG. 2.

In some instances, masking 320 can be performed subsequent to the classification 315 of the preprocessed multiplex immunofluorescence image. Masking 320 can include generating a mask for the multiplex immunofluorescence image 305 based on the prediction of the necrotic tissue detection machine-learning model. The mask can have different values for regions predicted to depict necrotic tissue and regions predicted to not depict necrotic tissue. The mask may then be used in subsequent image processing to further classify the multiplex immunofluorescence image 305, such as by identifying a presence and characteristics of tumor cells in the slice of specimen.

V. Exemplary U-Net Model

Figure 4:
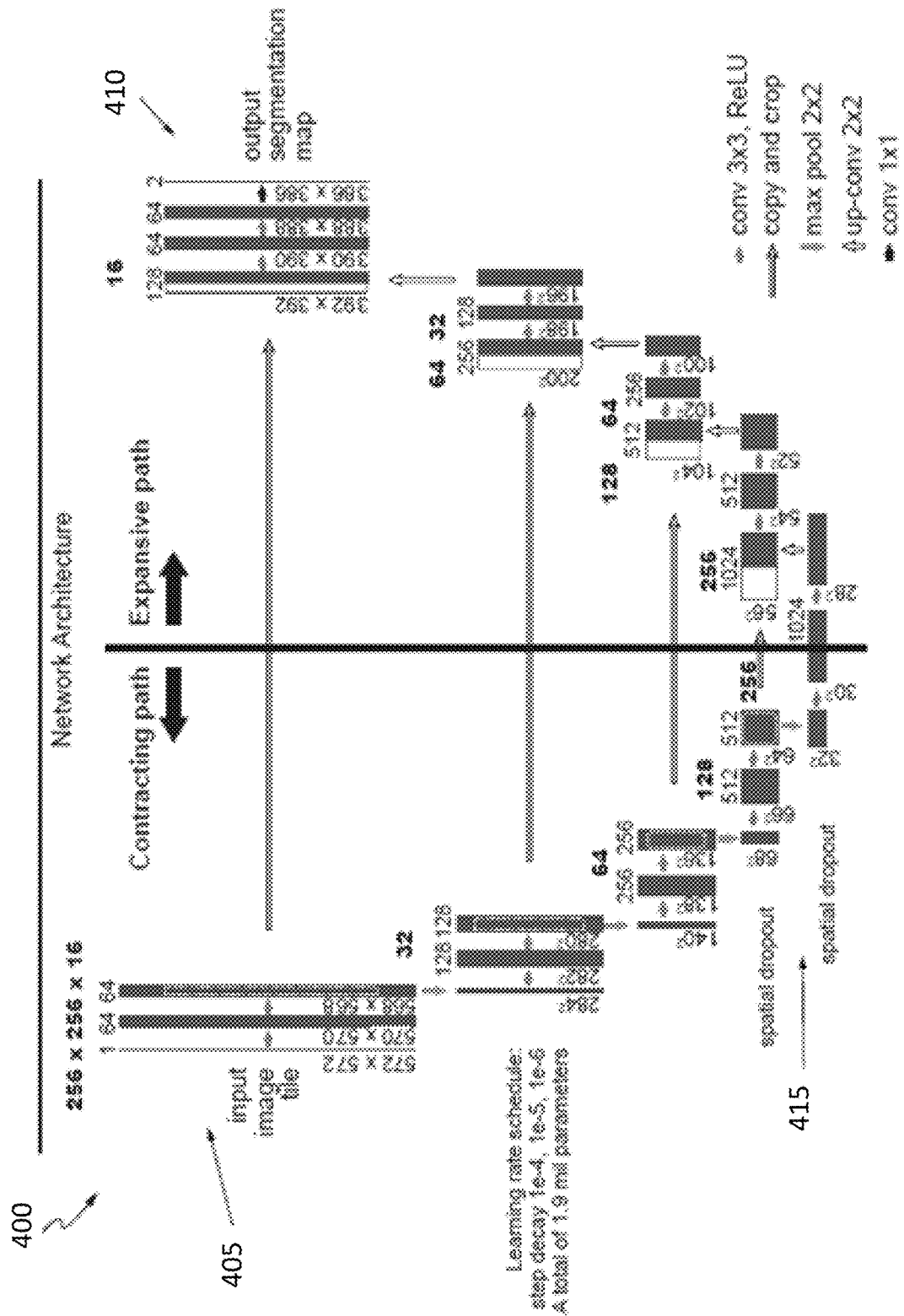
FIG. 4 illustrates an exemplary U-Net according to some aspects of the present disclosure.

As shown in FIG. 4, a U-Net 400 may include a contracting path 405 (encoder) and an expansive path 410 (decoder), which gives it a u-shaped architecture. The contracting path 405 is a CNN network that includes repeated application of convolutions (e.g., 3×3 convolutions (unpadded convolutions)), each followed by a rectified linear unit (ReLU) and a max pooling operation (e.g., a 2×2 max pooling with stride 2) for downsampling. At each downsampling step or pooling operation, the number of feature channels may be doubled. During the contraction, the spatial information of the image data is reduced while feature information is increased. The expansive path 410 is a CNN network that combines the feature and spatial information from the contracting path 405 (upsampling of the feature map from the contracting path 405). The upsampling of the feature map is followed by a sequence of up-convolutions (upsampling operators) that halves the number of channels, concatenations with a correspondingly cropped feature map from the contracting path 405, repeated application of convolutions (e.g., two 3×3 convolutions) that are each followed by a rectified linear unit (ReLU), and a final convolution (e.g., one 1×1 convolution) to generate the two-dimensional non-target region masks. In order to localize, the high-resolution features from the contracting path 405 are combined with the upsampled output from the expansive path 410.

In various embodiments, the U-Net 400 implements a number of channels that is reduced overall from that of a conventional U-Net architecture. Specifically, the number of channels of the intermediate activation output layers is reduced by a predetermined factor such as two or four (see e.g., the bold numbers within the contracting path 405 and the expansive path 410), for example, in the second layer, the number of channels is reduced by a factor of four from 64 to 16, etc., and the max number of channels is also reduced by a factor of four to 256 instead of 1024 as used in a conventional U-Net architecture. This reduction in channels is implemented to reduce the computation expense and model complexity. This compressed U-Net architecture may provide better results as compared to a conventional U-Net architecture having a max number of 1024 channels and no reduction in the number of channels. Moreover, the U-Net 400 comprises a spatial drop out 415 to combat overfitting. The spatial drop out 415 may be implemented in the last few layers (i.e., the last one, two, three, or four layers) of the contracting path 405. The spatial drop out 415 drops entire two-dimensional feature maps instead of individual elements as performed by conventional drop out. For example, if adjacent pixels within feature maps are strongly correlated (as is normally the case in early convolution layers) then conventional dropout will not regularize the activations and will otherwise result in an effective learning rate decrease. In contrast, the spatial drop out 415 will regularize the activations and help promote independence between feature maps and will otherwise result in an effective learning rate increase.

VI. Exemplary Preprocessing Techniques

Figure 5:
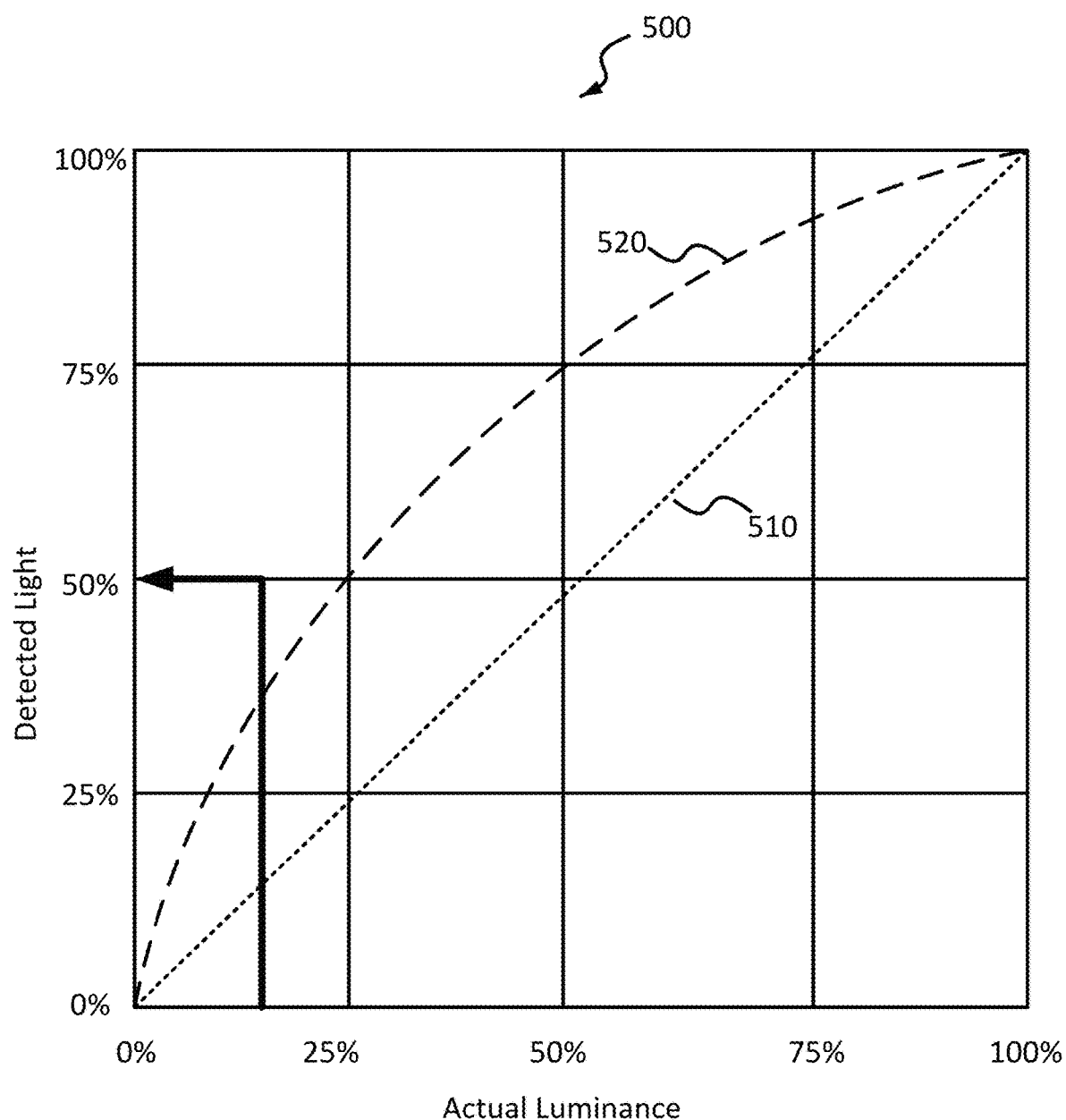
FIG. 5 illustrates a graph of gamma correction according to some aspects of the present disclosure.

FIG. 5 illustrates a graph 500 of gamma correction according to some aspects of the present disclosure. In digital imaging, there is a linear relationship between a luminance input and detected light output, as shown by line 510. For example, when a digital imaging system receives three times the number photons hitting the sensor, the detected light is three times higher. In contrast, an eye perceives three times the light as only a fraction of three times brighter, as shown by line 520. Gamma correction can be performed to translate bit usage of an image between an eye's sensitivity to light and that of a digital imaging system.

Gamma correction can be defined as $luminance_{out} = luminance_{in}^{\gamma}$. A $\gamma$ of 0.5 can be used for a multiplex immunofluorescence image with a 16-bit image range to bring the image range to 8-bit with pixel intensities between 0 and 255. Smaller luminance values can be given a higher weight and higher luminance value can be given a lower weight. For example, an input luminance of 25% can map to an output detected light of 50%, and an input luminance of 75% can map to an output detected light of 86% using a $\gamma$ of 0.5.

Figure 6:
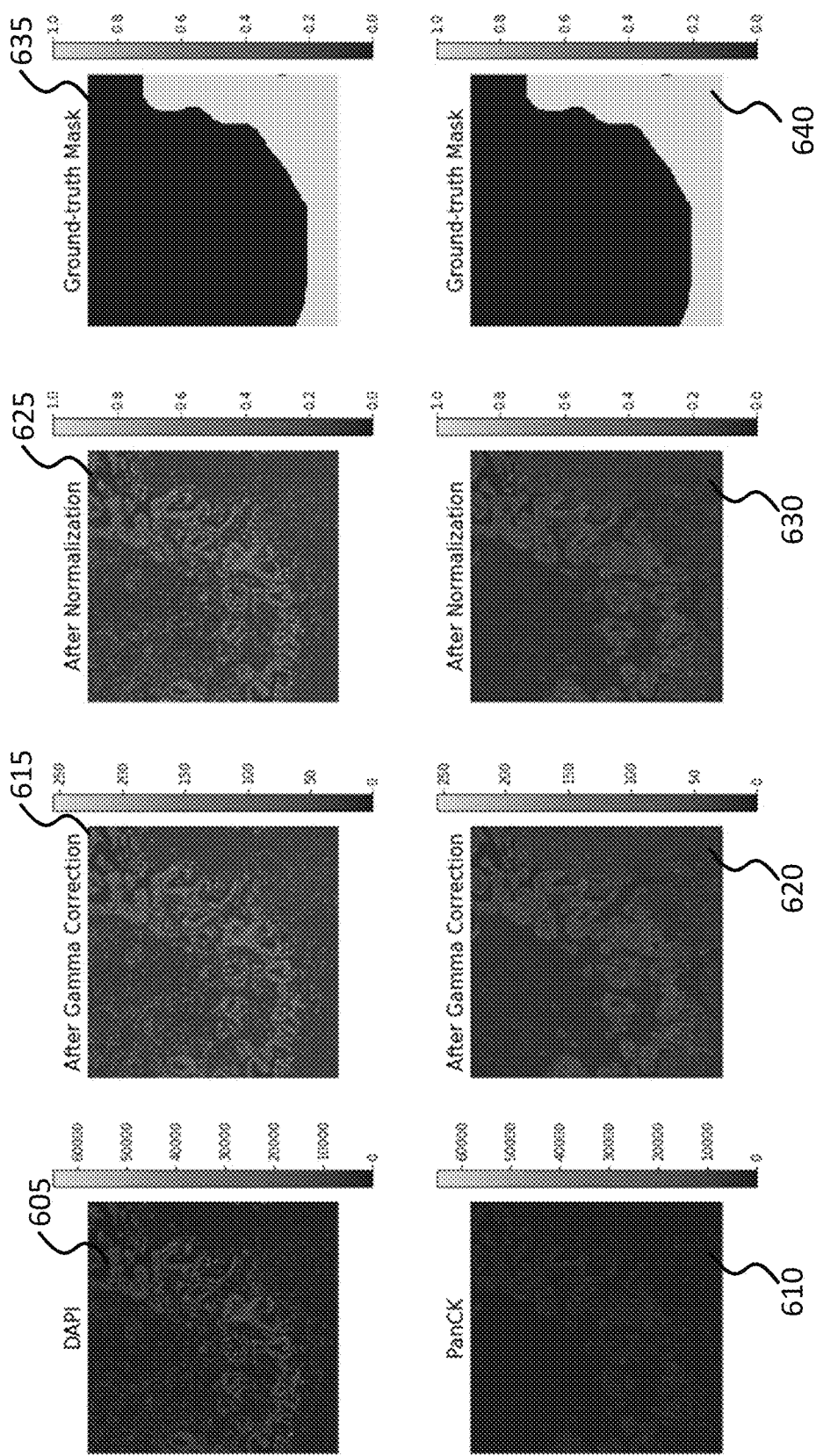
FIG. 6 illustrates exemplary results of preprocessing a multiplex immunofluorescence image according to some aspects of the present disclosure.

FIG. 6 illustrates exemplary results of preprocessing a multiplex immunofluorescence image according to some aspects of the present disclosure. A DAPI channel image 605 and a PanCK channel image 610 are shown. Gamma correction is performed on each of the DAPI channel image 605 and the PanCK channel image 610, as described in FIG. 5, resulting in gamma corrected images 615 and 620. Further preprocessing of normalization can then be performed on the gamma corrected images 615 and 620 to generate normalized images 625 and 630. The normalized images 625 and 630 can have pixel intensity values ranging between 0 and 1. The normalized images 625 and 630 may then be input into a necrotic tissue detection machine-learning model to predict portions of the images that depict necrotic tissue regions. Ground truth mask images 635 and 640 represent images generated manually by a pathologist that segment depictions of necrotic tissue from depictions of non-necrotic tissue. Lighter portions of the ground truth mask images 635 and 640 may represent depictions of necrotic tissue regions and darker portions may represent depictions of non-necrotic tissue regions, or vice versa.

Figure 7:
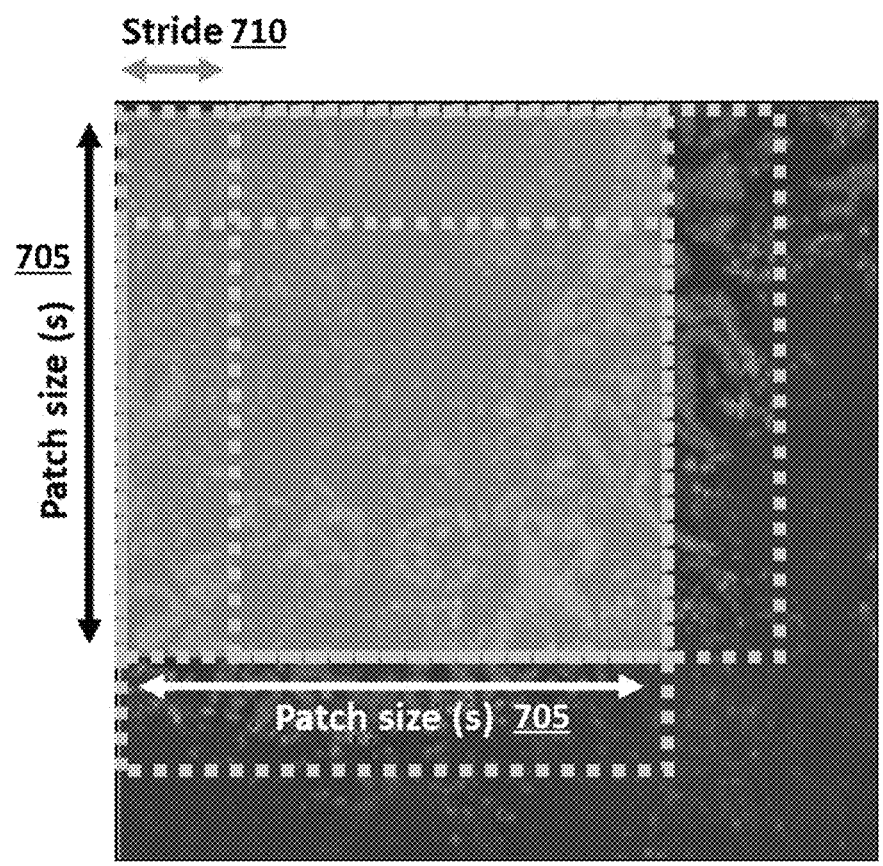
FIG. 7 illustrates an example of patch generation according to some aspects of the present disclosure.

FIG. 7 illustrates an example of patch generation according to some aspects of the present disclosure. In some instances, a whole slide multiplex immunofluorescence image may be divided into patches. Generating the patches may be performed during preprocessing. Patches having a fixed size 705 (e.g., 512×512 pixels) may be used. The patches may also be overlapping having a set stride 710. A sliding window may be used to generate the patches of the fixed size 705. After a patch is generated, the sliding window can be moved according to the set stride 710 to be positioned at a next patch location. During training of a necrotic tissue detection machine-learning model that predicts depictions necrotic tissue regions in a multiplec immunofluorescence image, patches and corresponding labels may be randomly selected and used as training images. The trained necrotic tissue detection machine-learning model may receive a patch rather than the whole-slide image to reduce computation requirements of the trained necrotic tissue detection machine-learning model.

Figure 8:
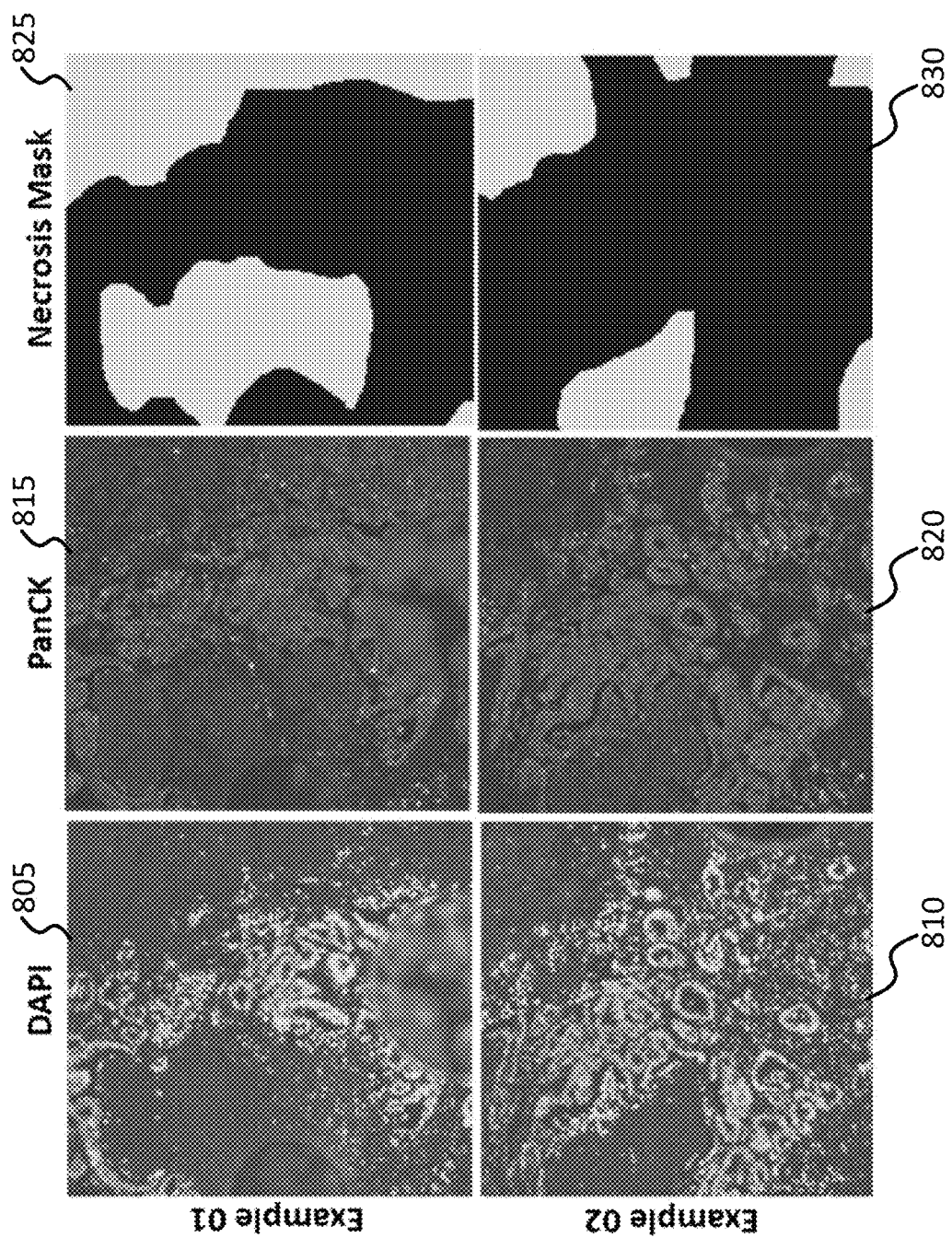
FIG. 8 shows exemplary input images and corresponding masks according to some aspects of the present disclosure.

FIG. 8 shows exemplary input images 800 and 802 and corresponding necrosis masks 825 and 830 according to some aspects of the present disclosure. The input images 800 and 802 include DAPI channel images 805 and 810, respectively, and PanCK channel images 815 and 820, respectively. The necrosis masks 825 were generated by a trained necrotic tissue detection machine-learning model for predicting depictions of necrotic tissue regions. Lighter portions of the necrosis masks 825 and 830 may represent depictions of necrotic tissue regions and darker portions may represent depictions of non-necrotic tissue regions, or vice versa.

VII. Example Use Cases

Figure 9:
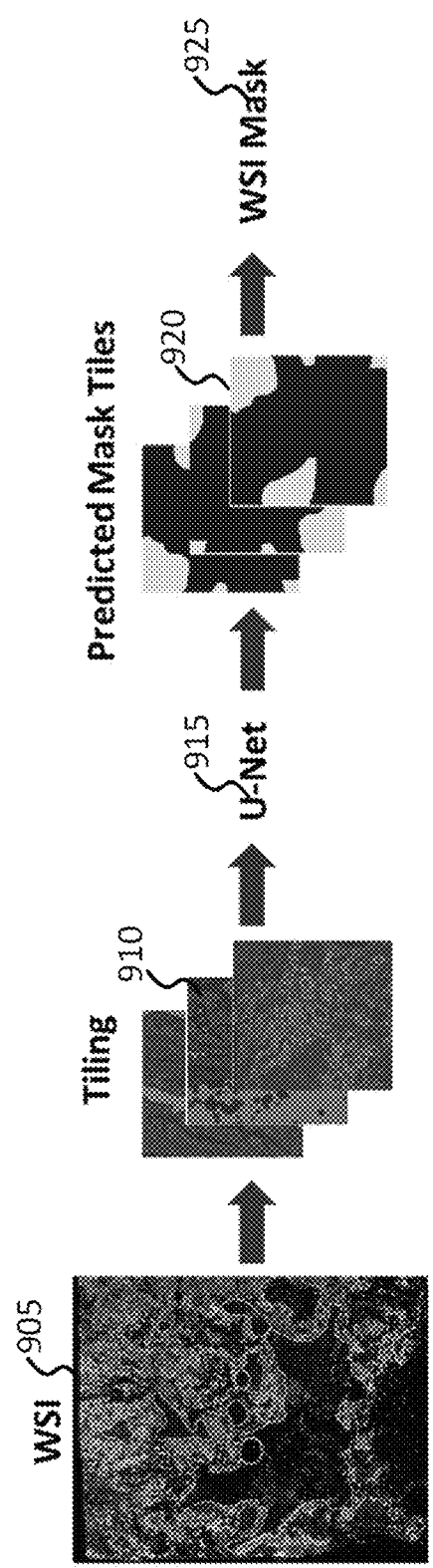
FIG. 9 illustrates an exemplary images during a process of identifying necrotic tissue regions according to some aspects of the present disclosure.

FIG. 9 illustrates an exemplary images during a process of identifying depictions of necrotic tissue regions according to some aspects of the present disclosure. A whole slide image 905 can be accessed by an analysis system (e.g., the analysis system 205 in FIG. 2). The whole slide image 905 can be preprocessed with gamma correction and/or normalization to reduce a range of pixel intensities of the whole slide image 905. In some instances, the preprocessing also involves tiling 910 the whole slide image 905. The tiling 910 can involve dividing the whole slide image 905 into non-overlapping portions of a fixed size (e.g., 1000 pixels×1000 pixels). Patches may be derived from each tile, and each patch can have a fixed size smaller than the fixed size of the tile. For example, each patch may be 512 pixels by 512 pixels.

The tiles can then be individually input to a U-Net model 915. The U-Net model 915 can be trained for predicting positions of necrotic tissue depicted in a multiplex immunofluorescence image. In some instances, the U-Net model 915 may receive patches of the tiles to process. The U-Net model 915 can output predictions of particular portions of the tiles (or patches) that depict necrotic tissue. A mask generator (e.g., the mask generator 245 in FIG. 2) can receive the output of the U-Net model 915 and generate predicted mask tiles 920 that include a first binary value for portions of the tiles predicted to depict necrotic tissue and a second binary value for portions of the tiles predicted to not depict necrotic tissue. The mask generator can then stitch the predicted mask tiles 920 together to generate a whole slide image mask 925 that corresponds to the whole slide image 905. The whole slide image mask 925 may be subsequently used to remove or modify the portions of the whole slide image 905 predicted to depict necrotic tissue during identification and classification of target regions in the whole slide image 905.

Figure 10:
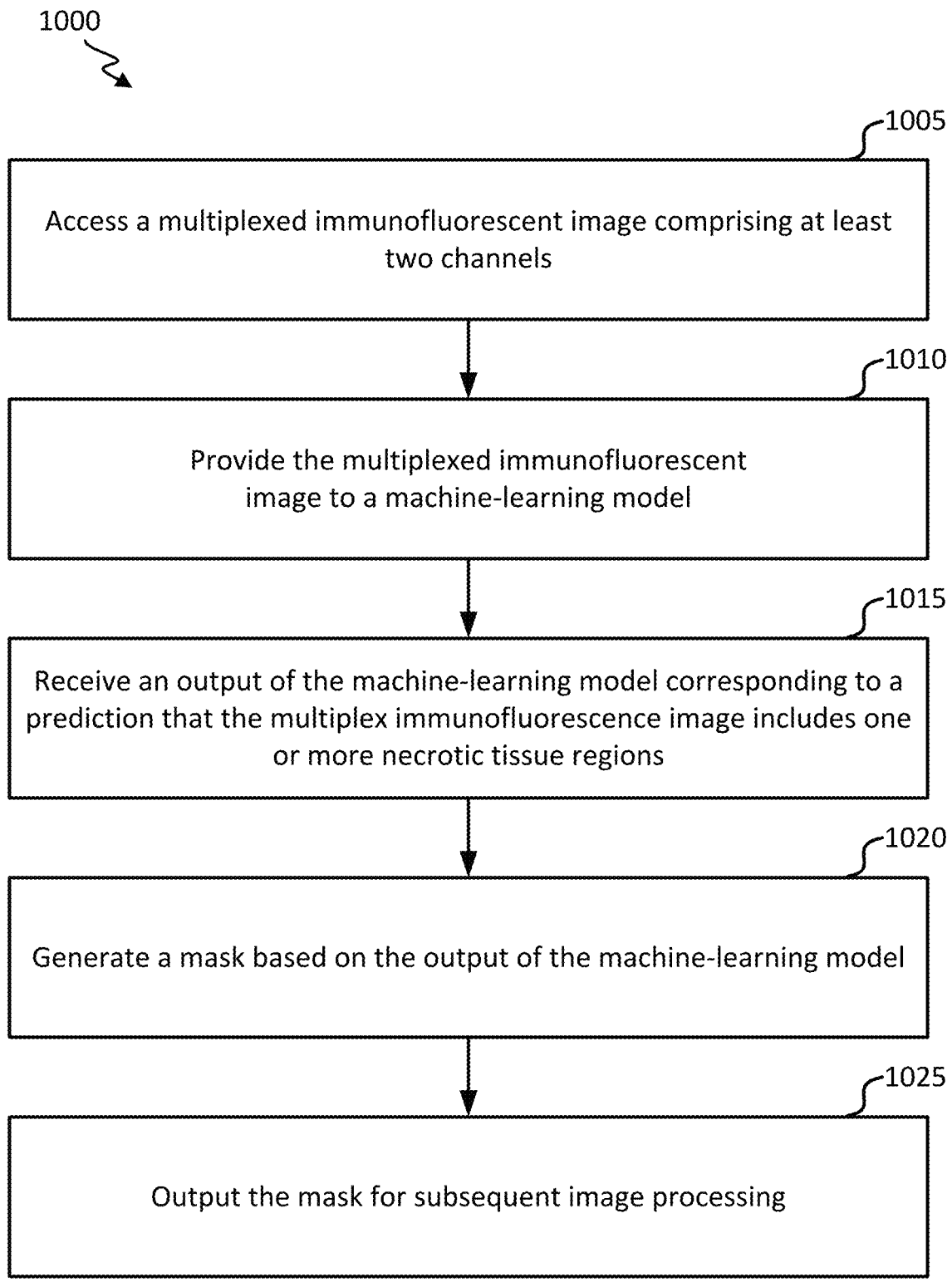
FIG. 10 illustrates an exemplary process of using a machine-learning model to identify necrotic tissue regions according to some aspects of the present disclosure.

FIG. 10 illustrates an exemplary process 1000 of using a necrotic tissue detection machine-learning model to identify depictions of necrotic tissue regions according to some aspects of the present disclosure. At block 1005, a multiplex immunofluorescence image of a slice of specimen is accessed. The multiplex immunofluorescence image may correspond to a whole slide image or a patch of a whole slide image depicting one or more necrotic tissue regions. The multiplex immunofluorescence image can include at least two channels (e.g., DAPI and PanCK) for determining a characterization of a set of tumor cells. Pre-processing of gamma correction and normalization may be performed on the multiplex immunofluorescence image.

At block 1010, a necrotic tissue detection machine-learning model processes the multiplex immunofluorescence image. The necrotic tissue detection machine-learning model can be trained with training multiplex immunofluorescence images of slices of specimen that include some slices with necrotic tissue and some slices without necrotic tissue. The necrotic tissue detection machine-learning model can be a deep neural network and/or a convolutional neural network. The necrotic tissue detection machine-learning model can include a U-Net model.

At block 1015, an output of the necrotic tissue detection machine-learning model is received. The output of the necrotic tissue detection machine-learning model can be a prediction of particular portions (e.g., one or more pixels) of the multiplex immunofluorescence image that depict necrotic tissue. Additionally, the output may include a determination of a metric (e.g., a cumulative size of necrotic tissue, a probability of depicting necrotic tissue) corresponding to the particular portions of the multiplex immunofluorescence image. The determination can be for each of one or more regions of the multiplex immunofluorescence image.

At block 1020, a mask is generated based on the output of the necrotic tissue detection machine-learning model. The mask can be an image with different values associated with pixels having a prediction of depicting necrotic tissue above a threshold (e.g., 50%) and other pixels having a prediction of depicting necrotic tissue below the threshold. The mask may be binary, or the mask may include various values corresponding to different predictions of depicting necrotic tissue.

At block 1025, the mask is output for subsequent image processing. One or more trained machine learning models or other image analysis techniques may be used for the subsequent image processing. The subsequent image processing can include modifying the multiplex immunofluorescence image, or another multiplex immunofluorescence image of the slice of specimen and processing the modified version of the multiplex immunofluorescence image. In some instances, the subsequent image processing can include detecting depictions of a set of tumor cells. A result of the subsequent image processing may be transmitted to another device (e.g., associated with a care provider) and/or displayed. The result can correspond to a predicted characterization of the specimen. The result can characterize a presence of, quantity of, and/or size of the set of tumor cells. The result may characterize more than one set of tumor cells for the multiplex immunofluorescence image. The result may be used for diagnosis or treatment assessment of a subject.

FIG. 10 shows one exemplary process for using a machine-learning model to identify necrotic tissue regions in a slice of specimen. Other examples can include more steps, fewer steps, different steps, or a different order of steps. For example, necrotic tissue identification can occur after tumor detection and classification as post-processing steps to exclude the identified necrotic tissue regions.

VIII. Additional Considerations

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A method for identification of necrotic tissue of digital pathology images comprising:

accessing, by a processor, a multiplex immunofluorescence image of a slice of specimen comprising a first channel for a nuclei marker and a second channel for an epithelial tumor marker, wherein the slice of specimen comprises one or more necrotic tissue regions, and wherein the nuclei marker comprises 4',6-diamidino-2-phenylindole (DAPI) and the epithelial tumor marker comprises pan-cytokeratin (PanCK);

preprocessing, by the processor, the multiplex immunofluorescence image using gamma correction and normalization;

providing, by the processor, the multiplex immunofluorescence image to a machine-learning model subsequent to preprocessing the multiplex immunofluorescence image;

receiving, by the processor, an output of the machine-learning model corresponding to a prediction that the multiplex immunofluorescence image includes one or more necrotic tissue regions at one or more particular portions of the multiplex immunofluorescence image;

generating, by the processor, a mask for subsequent image processing of the multiplex immunofluorescence image based on the output of the machine-learning model; and outputting, by the processor, the mask for the subsequent image processing.

2. The method of claim 1, wherein the machine-learning model comprises a U-Net model.

3. The method of claim 1, wherein the subsequent image processing includes:

generating, by the processor, a modified version of the multiplex immunofluorescence image by applying the mask to the multiplex immunofluorescence image;

processing, by the processor, the modified version of the multiplex immunofluorescence image; and outputting, by the processor, a result of processing the modified version of the multiplex immunofluorescence image corresponding to detected depictions of a set of tumor cells in the slice of specimen, wherein the result of the subsequent image processing characterizes at least one of a presence of, quantity of, or size of the set of tumor cells.

4. The method of claim 1, further comprising:

generating, by the processor, a plurality of tile images from the multiplex immunofluorescence image; and providing, by the processor, the plurality of tile images to the machine-learning model as the multiplex immunofluorescence image.

5. The method of claim 1, wherein the subsequent image processing includes:

accessing, by the processor, a second image of the slice of specimen;

applying, by the processor, the mask to the second image;

determining, by the processor, at least one of a presence of, quantity of, or size of a set of tumor cells in the slice of specimen by processing the second image with the mask; and outputting, by the processor, the at least one of the presence of, quantity of, or size of the set of tumor cells in the slice of specimen.

6. A system comprising:

one or more data processors; and a non-transitory computer readable storage medium containing instructions which, when executed on the one or more data processors, cause the one or more data processors to perform operations comprising:

receiving a multiplex immunofluorescence image of a slice of specimen comprising at least two channels, wherein the multiplex immunofluorescence image comprises one or more necrotic tissue regions, and wherein the at least two channels comprise a 4',6-diamidino-2-phenylindole (DAPI) channel and a pan-cytokeratin (PanCK) channel;

preprocessing the multiplex immunofluorescence image with gamma correction and normalization;

providing the preprocessed multiplex immunofluorescence image to a machine-learning model to identify the one or more necrotic tissue regions subsequent to preprocessing the multiplex immunofluorescence image;

generating a mask for subsequent image processing of the multiplex immunofluorescence image based on an output of the machine-learning model; and outputting the mask for the subsequent image processing.

7. The system of claim 6, wherein the machine-learning model comprises a U-Net model.

8. The system of claim 6, wherein the subsequent image processing includes:

generating a modified version of the multiplex immunofluorescence image by applying the mask to the multiplex immunofluorescence image;

processing the modified version of the multiplex immunofluorescence image; and outputting a result of processing the modified version of the multiplex immunofluorescence image corresponding to detected depictions of a set of tumor cells in the slice of specimen, wherein the result of the subsequent image processing characterizes at least one of a presence of, quantity of, or size of the set of tumor cells.

9. The system of claim 6, wherein the non-transitory computer readable storage medium further contains instructions which, when executed on the one or more data processors, cause the one or more data processors to perform operations comprising:

generating a plurality of tile images from the multiplex immunofluorescence image; and providing the plurality of tile images to the machine-learning model as the multiplex immunofluorescence image.

10. The system of claim 6, wherein the subsequent image processing includes:

accessing a second image of the slice of specimen;

applying the mask to the second image;

determining at least one of a presence of, quantity of, or size of a set of tumor cells in the slice of specimen by processing the second image with the mask; and outputting the at least one of the presence of, quantity of, or size of the set of tumor cells in the slice of specimen.

11. A computer-program product tangibly embodied in a non-transitory machine-readable storage medium, including instructions configured to cause one or more data processors to perform operations comprising:

accessing a multiplex immunofluorescence image of a slice of specimen comprising a first channel for a nuclei marker and a second channel for an epithelial tumor marker, wherein the multiplex immunofluorescence image comprises one or more necrotic tissue regions, and wherein the nuclei marker comprises 4',6-diamidino-2-phenylindole (DAPI) and the epithelial tumor marker comprises pan-cytokeratin (PanCK);

preprocessing the multiplex immunofluorescence image using gamma correction and normalization;

providing the multiplex immunofluorescence image to a machine-learning model subsequent to preprocessing the multiplex immunofluorescence image, wherein an output of the machine-learning model corresponds to a prediction that the multiplex immunofluorescence image includes one or more necrotic tissue regions at one or more particular portions of the multiplex immunofluorescence image;

generating a mask for subsequent image processing of the multiplex immunofluorescence image based on the output of the machine-learning model; and outputting the mask for the subsequent image processing.

12. The computer-program product of claim 11, wherein the machine-learning model comprises a U-Net model.

13. The computer-program product of claim 11, wherein the subsequent image processing includes:

generating a modified version of the multiplex immunofluorescence image by applying the mask to the multiplex immunofluorescence image;
processing the modified version of the multiplex immunofluorescence image; and
outputting a result of processing the modified version of the multiplex immunofluorescence image corresponding to detected depictions of a set of tumor cells in the slice of specimen, wherein the result of the subsequent image processing characterizes at least one of a presence of, quantity of, or size of the set of tumor cells.

14. The computer-program product of claim 11, further including instructions configured to cause one or more data processors to perform operations comprising:
generating a plurality of tile images from the multiplex immunofluorescence image; and
providing the plurality of tile images to the machine-learning model as the multiplex immunofluorescence image.

15. The computer-program product claim 11, wherein the subsequent image processing includes:
accessing a second image of the slice of specimen;
applying the mask to the second image;
determining at least one of a presence of, quantity of, or size of a set of tumor cells in the slice of specimen by processing the second image with the mask; and
outputting the at least one of the presence of, quantity of, or size of the set of tumor cells in the slice of specimen.

* * * * *